United States Patent [19]

Levine et al.

[11] 4,011,382
[45] Mar. 8, 1977

[54] PREPARATION OF LOW AND MEDIUM DENSITY ETHYLENE POLYMER IN FLUID BED REACTOR

[75] Inventors: Isaac J. Levine, Somerville; Frederick J. Karol, Bellemead, both of N.J.

[73] Assignee: Union Carbide Corporation, New York, N.Y.

[22] Filed: Mar. 10, 1975

[21] Appl. No.: 557,122

[52] U.S. Cl. .................................. 526/96; 526/98; 526/106
[51] Int. Cl.² ...................... C08F 2/34; C08F 4/16; C08F 4/24; C08F 10/00
[58] Field of Search ................ 260/88.2 R, 88.2 F; 526/96, 98, 106

[56] References Cited
UNITED STATES PATENTS

| | | | |
|---|---|---|---|
| 2,953,552 | 9/1960 | Stampa et al. | 260/88.2 R |
| 3,023,203 | 2/1962 | Dye | 260/88.2 B |
| 3,445,367 | 5/1969 | Kallenbach | 260/88.2 R |
| 3,509,116 | 4/1970 | Cote et al. | 260/88.2 R |
| 3,513,143 | 5/1970 | Diedrich et al. | 260/88.2 R |
| 3,622,521 | 11/1971 | Hogan et al. | 260/93.7 |
| 3,798,202 | 3/1974 | Nasser, Jr. | 260/88.2 R |
| 3,876,602 | 4/1975 | Calvert et al. | 260/88.2 R |
| 3,879,362 | 4/1975 | Chalfont et al. | 260/88.2 R |

*Primary Examiner*—Alan Holler
*Attorney, Agent, or Firm*—James J. O'Connell

[57] ABSTRACT

A supported catalyst is used in the low pressure catalytic copolymerization of ethylene with $C_3$ to $C_6$ α-olefins in a fluid bed reactor to produce polymers having a density of less than 0.941 and a melt index of >0.0 to at least about 2.0. The supported catalyst contains about 0.05 to 3.0 weight % of chromium, about 1.5 to 9.0 weight % of titanium and >0.0 to about 2.5 weight % of fluorine.

10 Claims, 1 Drawing Figure

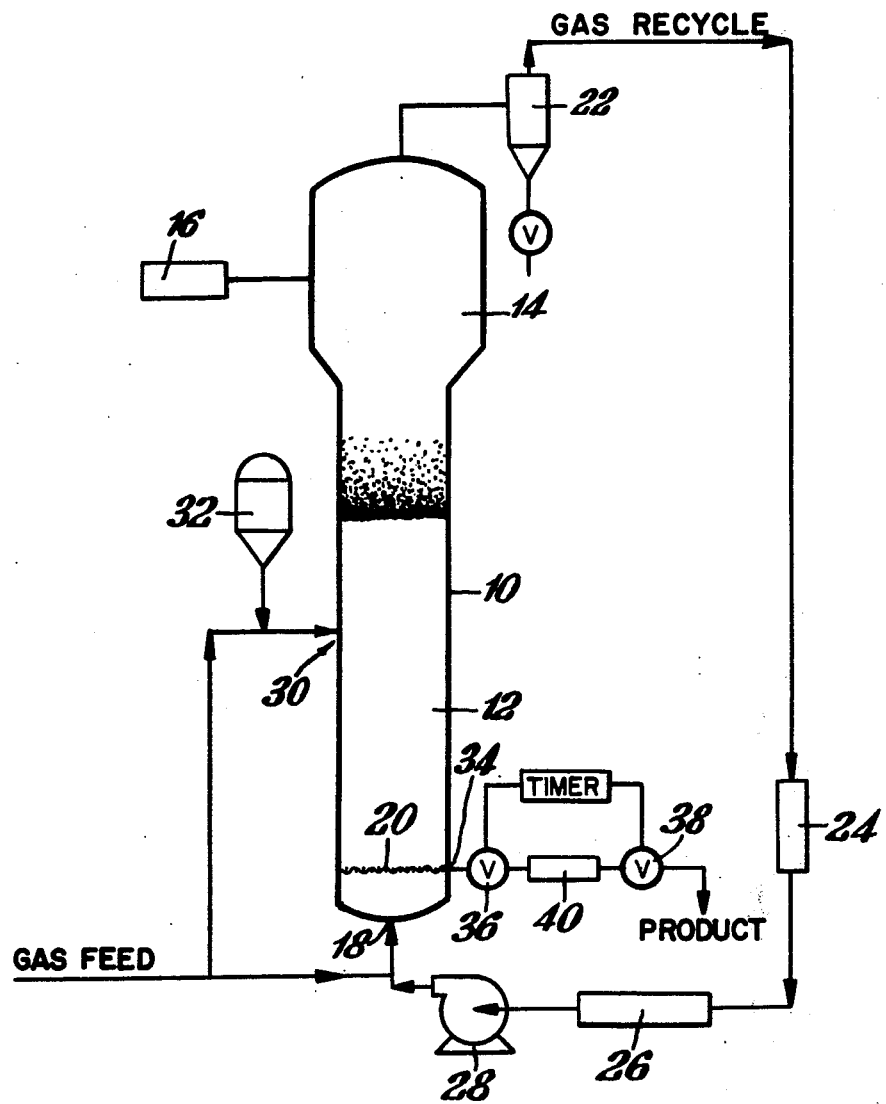

PREPARATION OF LOW AND MEDIUM DENSITY ETHYLENE POLYMER IN FLUID BED REACTOR

BACKGROUND OF THE INVENTION

1. Field of the Invention

The invention relates to the catalytic copolymerization of ethylene with other copolymerizable monomers in a fluid bed reactor to produce low (0.900 to 0.925) and medium (0.926 to 0.940) density ethylene copolymers.

2. Description of the Prior Art

The commercialization of low and medium density ethylene polymers is much more significant in the United States, and in the rest of the world, than is the commercialization of high density ($>0.940$) ethylene polymers. The low density polymers are usually made commercially by homopolymerizing ethylene with free radical catalysts under very high pressures ($\geq 15,000$ psi) in tubular and stirred reactors, in the absence of solvents. The medium density polymers can also be made commercially by the high pressure process, or by blending high pressure polyethylene with high density polyethylene made in a low pressure process with transition metal based catalysts.

The preparation of ethylene polymers in the absence of solvents under low pressures (~40–350 psi) in a fluid bed reactor, using various supported chromium containing catalysts, is disclosed in U.S. Pat. Nos. 3,023,203; 3,687,920; 3,704,287; 3,709,853, Belgium Pat. No. 773,050 (which corresponds to U.S. Patent Application S.N. 156,187 filed June 24, 1971, and abandoned in favor of continuation-in-part application S.N. 426,559 filed Dec. 20, 1973) and Netherlands Patent Application 72-10881. These publications also disclose that the ethylene polymers produced may be ethylene homopolymers or copolymers of ethylene and one or more other alpha olefins.

The disclosures in these patent publications are primarily concerned with the preparation of high density ethylene polymers. Furthermore, because of the technical difficulties involved, it has not been possible, prior to the present invention, to provide a commercially useful process for the production of low and medium density ethylene polymers in a low pressure fluid bed process. In order to provide such a useful process, the catalyst employed must be one which can, simultaneously, copolymerize ethylene with other alpha olefins so as to provide the desired density range in the copolymer product; provide a polymer product having a particle size which is conductive to being readily fluidized in a fluid bed reactor; provide such a high degree of productivity that the catalyst residues in the polymer product are so small as to allow them to remain therein, and thus avoid the need for catalyst removal steps; provide a polymer product which can be readily molded in a variety of molding applications, i.e., provide a polymer product having a relatively wide melt index range; provide a polymer product which has a relatively small low molecular weight fraction content so as to allow the product to meet Federal Food and Drug Administration standards for extractables ($<5.5$ weight percent at 50° C. in n-hexane) for food contact applications; and be used in solid form to provide such copolymer products under the operating conditions which can be readily achieved in a commercial sized fluid bed reactor.

Thus, attempts to use various prior art catalysts, for the purposes of attempting to make low to medium density ethylene polymers in a commercially useful fluid bed process have not been successful to date, since such catalysts do not provide the desired combination of features noted above. For example, certain Ziegler catalysts provide products which have a very narrow melt index range (0.0 to $\sim<0.2$), and are readily subject to catalyst poisoning and have a relatively low productivity as evidenced by a catalyst residue content of greater than about ten parts per million of transition metal. The Ziegler polymers thus usually have to undergo a catalyst residue removal operation.

The supported bis(cyclopentadienyl)chromium [II] catalysts disclosed in U.S. Pat. No. 3,687,920; U.S. Pat. No. 3,709,853 and Belgian Pat. No. 773,050 do not readily allow for the copolymerization of enough of the suitable comonomers with ethylene to provide copolymers having densities below about 0.945.

Although the family of supported silyl chromate catalysts disclosed in U.S. Pat. No. 3,324,095, U.S. Pat. No. 3,324,101 and U.S. Pat. No. 3,704,287 will provide ethylene copolymers of relatively low density, some of the catalysts in the family will provide polymer products which have a high content of small particle sizes which cannot be readily fluidized, and/or which have a narrow melt index range (0.0 to $\sim<0.2$), and/or which have a relatively high n-hexane extractables content.

The supported chromium oxide catalysts disclosed in U.S. Pat. Nos. 2,825,721 and 3,023,203 can be used to provide low and medium density ethylene copolymers provided that relatively high ratios of comonomer to ethylene are employed in the monomer feed stream. However, the copolymers produced have a relatively narrow melt index range (0.0 to $\sim<0.2$). The supported titanated chromium oxide catalysts disclosed in U.S. Pat. No. 3,622,521 provide copolymers which have a relatively high level of extractables (in n-hexane at 50° C.) therein.

Netherlands Patent Application 72-10881 discloses the use of a supported fluorided and titanated chromium oxide catalyst for ethylene polymerization purposes, but does not disclose a practical method for making low to medium density ethylene copolymers in a commercially useful fluid bed process.

Thus, based on the technology known prior to the present invention, it was not possible to make low to medium density ethylene polymers having a relatively high melt index of $>0.0$ to about 2.0, a relatively low n-hexane soluble fraction and a relatively low residual catalyst content at relatively low temperatures and pressures in the absence of solvent in a commercially useful fluid bed process.

SUMMARY OF THE INVENTION

It has now been unexpectedly found that ethylene copolymers having a density of about 0.900 to 0.940 and a melt index of $>0.0$ to at least about 2.0 which have a relatively low n-hexane extractables content and residual catalyst content can be produced at relatively high productivities for commercial purposes in a fluid bed process if the ethylene is polymerized in the process of the present invention with one or more $C_3$ to $C_6$ alpha olefins in the presence of a supported catalyst which has a specific particle size and which contains specific amounts of chromium, titanium and fluorine.

An object of the present invention is to provide a process for producing, with relatively high productivities and in a low pressure fluid bed process, ethylene copolymers which have a density of about 0.900 to 0.940, a melt index of >0.0 to at least about 2.0, a relatively low n-hexane extractables content, and a relatively low residual catalyst content.

BRIEF DESCRIPTION OF THE DRAWINGS

The drawing shows a fluid bed reactor system in which the catalyst system of the present invention may be employed.

DESCRIPTION OF THE PREFERRED EMBODIMENT

It has now been found that the desired low to medium density ethylene copolymers may be readily produced with relatively high productivities in a low pressure fluid bed reaction process, if the comonomers are copolymerized under a specific set of operating conditions, as detailed below, and in the presence of a particulate activated supported catalyst which contains specific amounts of chromium, titanium, and fluorine, as is also detailed below.

The Copolymers

The copolymers which may be prepared in the process of the present invention are copolymers of a major mol percent ($\geq 85\%$) of ethylene, and a minor mol percent (>15%) of one or more $C_3$ to $C_6$ alpha olefins. These alpha olefins are preferably propylene, butene-1, pentene-1 and hexene-1.

The copolymers have a density of about 0.900 to 0.925 for low density polymers and of about 0.926 to 0.940 for medium density polymers. The density of the polymer, at a given melt index level for the polymer, is primarily regulated by the amount of the $C_3$ to $C_6$ comonomer which is copolymerized with the ethylene. In the absence of the comonomer, the ethylene would homopolymerize with the catalyst of the present invention to provide homopolymers having a density of about $\geq 0.95$. Thus, the addition of progressively larger amounts of the comonomers to the polymers results in a progressive lowering, in approximately a linear fashion, of the density of the polymer. The amount of each of the various $C_3$ to $C_6$ comonomers needed to achieve the same result will vary from monomer to monomer, under the same reaction conditions.

Thus, to achieve the same results, in terms of a given density, at a given melt index level, larger molar amounts of the comonomers would be needed in the order of $C_3>C_4>C_5>C_6$.

The melt index of a polymer is a reflection of its molecular weight. Polymers having a relatively high molecular weight, have a relatively low melt index. Ultra-high molecular weight ethylene polymers have a high load (HLMI) melt index of about 0.0 and very high molecular weight polymers have a high load melt index (HLMI) of about 0.0 to about 1.0. Such high molecular weight polymers are difficult, if not impossible, to mold in conventional injection molding equipment. The copolymers made in the process of the present invention, on the other hand, can be readily molded, in such equipment. They have a standard or normal load melt index of >0.0 to at least about 2.0, and preferably of about 0.1 to 1.0, and a high load melt index (HLMI) of about 1 to about 100. The melt index of the polymers which are made in the process of the present invention is a function of a combination of the polymerization temperature of the reaction, the density of the polymer and the titanium content of the catalyst. Thus, the melt index is raised by increasing the polymerization temperature and/or by decreasing the density of the polymer (by increasing the comonomer-/ethylene ratio) and/or by increasing the titanium content of the catalyst.

The copolymers made in the process of the present invention have a n-hexane extractables content (at 50° C.) of less than about 12 percent, and preferably of less than about 5.5 percent. The n-hexane extractables content is a function of the fluorine content of the catalyst. As the fluorine content of the catalyst is increased the extractable fraction content of the polymer is lowered. Increasing the fluorine content of the catalyst also improves the rate of incorporation of the $C_3$ to $C_6$ comonomer in the copolymer. An increase in fluorine content, however, also tends to lower the melt index of the polymers.

The copolymers made in the process of the present invention have a residual catalyst content, in terms of parts per million of chromium metal, of the order of less than about 10 parts per million, and preferably of the order of less than about 3 parts per million. This catalyst residue content is primarily a function of the productivity of the catalyst. The productivity of the catalyst is primarily a function of the chromium content thereof.

The copolymers of the present invention have an average particle size of the order of about 0.005 to about 0.06 inches, and preferably of about 0.01 to about 0.05 inches, in diameter. The particle size is important for the purposes of readily fluidizing the polymer particles in the fluid bed reactor, as described below.

Activated Supported Catalyst

The catalyst used in the process of the present invention is a chromium oxide ($CrO_3$) based catalyst which is formed, in general, by depositing a suitable chromium compound, titanium compound and fluorine compound on a dried support, and then activating the resulting composite composition by heating it in air or oxygen at a temperature of about 300° to about 900° C., and preferably at about 700° to 850° C., for at least 2 hours, and preferably for about 5 to 15 hours. The chromium compound, titanium compound and fluorine compound are usually deposited on the support from solutions thereof and in such quantities as to provide, after the activation step, the desired levels of Cr, Ti and F in the catalyst. After the compounds are placed on the support and it is activated, there results a powdery, free-flowing particulate material. About 0.005 to 1 weight percent of the composite catalyst is employed per pound of polymer produced.

The order of the addition of the chromium compound, titanium compound and fluorine compound to the support is not critical provided that all of the compounds are added before the activation of the composite catalyst and the support is dried before the titanium compound is added thereto.

After the activation of the supported catalyst it contains, based on the combined weight of the support and the chromium, titanium and fluorine therein,
  about 0.05 to 3.0, and preferably about 0.2 to 1.0, weight percent of chromium (calculated as Cr),
  about 1.5 to 9.0, and preferably about 4.0 to 7.0, weight percent of titanium (calculated as, Ti), and >0.0 to about 2.5, and preferably about 0.1 to 1.0, weight percent of fluorine (calculated as F).

The chromium compounds which may be used include $CrO_3$, or any compound of chromium which is ignitable to $CrO_3$ under the activation conditions employed. At least a portion of the chromium in the supported, activated catalyst must be in the hexavalent state. Chromium compounds other than $CrO_3$ which may be used are disclosed in U.S. Pat. Nos. 2,825,721 and 3,622,521 (the disclosures of which patents are hereby incorporated by reference) and include chromic acetyl acetonate, chromic nitrate, chromic acetate, chromic chloride, chromic sulfate, and ammonium chromate.

Water soluble compounds of chromium, such as $CrO_3$, are the preferred compounds for use in depositing the chromium compound on the support from a solution of the compound. Organic solvent soluble chromium compounds may also be used.

The titanium compounds which may be used include all those which are ignitable to $TiO_2$ under the activation conditions employed, and include those disclosed in U.S. Pat. No. 3,622,521 and Netherlands Patent Application 72-10881 (the disclosures of which publications are hereby incorporated by reference). These compounds include those having the structures $(R')_n\text{-}Ti(OR')_m$ and $(RO)_m Ti(OR')_n$ where $m$ is 1, 2, 3 or 4; $n$ is 0, 1, 2 or 3 and $m + n = 4$, and, $TiX_4$ where R is a $C_1$ to $C_{12}$ alkyl, aryl or cycloalkyl group, and combinations thereof, such as aralkyl, alkaryl, and the like;

$R'$ is R, cyclopentadienyl, and $C_2$ to $C_{12}$ alkenyl groups, such as ethenyl, propenyl, isopropenyl, butenyl and the like; and X is chlorine, bromine, fluorine or iodine.

The titanium compounds would thus include titanium tetrachloride, titanium tetraisopropoxide and titanium tetrabutoxide. The titanium compounds are more conveniently deposited on the support from a hydrocarbon solvent solution thereof.

The titanium (as Ti) is present in the catalyst, with respect to the Cr (as Cr), in a mol ratio of about 0.5 to 180, and preferably of about 4 to 35.

The fluorine compounds which may be used include HF, or any compound of fluorine which will yield HF under the activation conditions employed. Fluorine compounds other than HF which may be used are disclosed in Netherlands patent application 72-10881. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The inorganic oxide materials which may be used as a support in the catalyst compositions of the present invention are porous materials having a high surface area, that is, a surface area in the range of about 50 to about 1000 square meters per gram, and a particle size of about 50 to 200 microns. The inorganic oxides which may be used include silica, alumina, thoria, zirconia and other comparable inorganic oxides, as well as mixtures of such oxides.

The catalyst support which may have the chromium and/or fluorine compound deposited thereon should be dried before it is brought into contact with the titanium compound. This is normally done by simply heating or pre-drying the catalyst support with a dry inert gas or dry air prior to use. It has been found that the temperature of drying has an appreciable effect on the molecular weight distribution and the melt index of the polymer produced. The preferred drying temperature is 100 to 300° C.

Activation of the supported catalyst can be accomplished at nearly any temperature up to about its sintering temperature. The passage of a stream of dry air or oxygen through the supported catalyst during the activation aids in the displacement of the water from the support. Activation temperatures of from about 300° C. to 900° C. for a short period of about 6 hours or so should be sufficient if well dried air or oxygen is used, and the temperature is not permitted to get so high as cause sintering of the support.

Any grade of support can be used but microspheroidal intermediate density (MSID) silica having a surface area of 300 square meters per gram, and a pore diameter of about 200 A, and an average particle size of about 70 microns (~0.0028 inches) (W. R. Grace's G-952 grade), and intermediate density (ID) silica having a surface area of about 300 m²/gr, a pore diameter of about 160 A and an average particle size of about 103 microns (~0.0040 inches) (W. R. Grace's G-56 grade) are preferred.

When incorporated in a porous support of high surface area, as described herein, the chromium forms active sites on the surface and in the pores of the support. Although the actual mechanism of the process is not entirely understood, it is believed that the polymers begin to grow at the surface as well as in the pores of the supported catalyst. When a pore grown polymer becomes large enough in the fluidized bed, it ruptures the support thereby exposing fresh catalyst sites in the inner pores of the support. The supported catalyst may thus subdivide many times during its lifetime in the fluidized bed and thereby enhance the production of low catalyst residue polymers, thereby eliminating the need for recovering the catalyst from the polymer particles. If the support is too large, it may resist rupture thereby preventing subdivision which would result in catalyst waste. In addition, a large support may act as a heat sink and cause "hot spots" to form.

The Polymerization Reaction

After the activated catalyst has been formed, the copolymerization reaction is conducted by contacting a stream of the comonomers, in a fluid bed reactor as described below, and substantially in the absence of catalyst poisons such as moisture, oxygen, carbon monoxide and acetylene, with a catalytically effective amount of the catalyst at a temperature and at a pressure sufficient to initiate the polymerization reaction. The catalyst of the present invention can be used in the presence of up to about 200 parts per million of $CO_2$.

In order to achieve the desired density ranges in the copolymers it is necessary to copolymerize enough of the $\geq C_3$ comonomers with ethylene to achieve a level of 1.0 to 15 mol percent of the $C_3$ to $C_6$ comonomer in the copolymer. The amount of comonomer needed to achieve this result will depend on the particular comonomer(s) being employed and on the fluoride content of the catalyst. Some increased fluoride content of the catalyst improves the comonomer incorporation. Further, the various intended comonomers have different reactivity rates, relative to the reactivity rate of ethylene, with respect to the copolymerization thereof with the catalysts of the present invention.

Therefore, the amount of comonomer used in the stream of monomers fed to the reactor will also vary depending on the reactivity of the comonomer.

There is provided below a listing of the amounts, in mols, of various comonomers that must be copolymerized with ethylene in order to provide polymers having the desired density range at any given melt index. The listing also indicates the concentration, in mol %, of such comonomers which must be present in the gas stream of monomers which is fed to the reactor.

| Comonomer | mol % needed in copolymer | mol % needed in gas stream |
|---|---|---|
| propylene | 3.0 to 15 | 6 to 30 |
| butene-1 | 2.5 to 12 | 6 to 25 |
| pentene-1 | 2.0 to 9.0 | 4 to 18 |
| hexene-1 | 1.0 to 7.5 | 3 to 15 |

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst fluidized by the continuous flow of polymerizable and modifying gaseous components in the form of make-up feed and recycle gas through the reaction zone. To maintain a viable fluidized bed, mass gas flow through the bed must be above the minimum flow required for fluidization, preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the powdery catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired particles supplants the start-up bed.

The supported catalyst used in the fluidized bed is preferably stored for service in a reservoir 32 under a nitrogen blanket.

Fluidization is achieved by a high rate of gas recycle to and through the bed, typically in the order of about 50 times the rate of feed of make-up gas. The fluidized bed has the general appearance of a dense mass of viable particles in possibly free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines component deficiency in the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom 6 to 12 inches of the bed, between the temperature of the inlet gas and the temperature of the remainder of the bed. Thus it has been observed that the bed acts to almost immediately adjust the temperature of the recycle gas above this lower 6 to 12 inch bed zone to make it conform to the temperature of the bed thereby maintaining itself at an essentially constant temperature under steady state conditions. The recycle is then compressed in a compressor 28 and returned to the reactor at its base 18 and to the fluidized bed through distribution plate 20. The compressor 28 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention in amounts varying between about 0.001 to about 10 moles of hydrogen per mole of ethylene and comonomer.

Also, if desired for temperature control of the system, any gas inert to the catalyst and reactants can also be present in the gas stream.

It is essential to operate the fluid bed reactor at a temperature below the sintering temperature of the polymer particles. To insure that sintering will not occur, operating temperatures below the sintering temperature are desired. For the production of the ethylene copolymers in the process of the present invention an operating temperature of about 30° to 105° C. is preferred, and a temperature of about 85° to 95° C. is most preferred. Temperatures of about 85° to 96° C. are used to prepare products having a density of about 0.900 to 0.920, and temperatures of about 85° to 100° C. are used to prepare products having a density of about 0.921 to 0.940.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The catalyst is injected into the bed at a rate equal to its consumption at a point 30 which is above the distribution plate 20. Preferably, the catalyst is injected at a point located about ¼ to ¾ up the side of the bed. Injecting the catalyst at a point above the distribution plate is an important feature of this invention. Since the catalysts used in the practice of the invention are highly active, injection into the area below the distribution plate may cause polymerization to begin there are eventually cause plugging of the distribution plate. Injection into the viable bed, instead, aids in distributing the catalyst throughout the bed and tends to preclude the formation of localized spots of high catalyst concentration which may result in the formation of "hot spots".

Inert gas such as nitrogen is used to carry the catalyst into the bed.

The production rate of the bed is solely controlled by the rate of catalyst injection. The productivity of the bed may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to wait the next product recovery operation.

Finally, the fluidized bed reactor is equipped with an adequate venting system to allow venting the bed during start up and shut down. The reactor does not require the use of stirring means and/or wall scrapping means.

The supported catalyst system of this invention appears to yield a fluid bed product having an average particle size between about 0.005 to about 0.06 inches and preferably about 0.01 to about 0.05 inches wherein supported catalyst residue is unusually low.

The feed stream of gaseous monomer, with or without inert gaseous diluents, is fed into the reactor at a space time yield of about 2 to 10 pounds/hour/cubic foot of bed volume.

The following Examples are designed to illustrate the process of the present invention and are not intended as a limitation upon the scope thereof.

The properties of the polymers produced in the Examples were determined by the following test methods:

| | |
|---|---|
| Density | ASTM D-1505 - Plaque is conditioned for one hour at 100° C. to approach equilibrium crystallinity. |
| Melt Index ($MI$) | ASTM D-1238 - Condition E - Measured at 190° C. - reported as grams per 10 minutes. |
| Flow Rate ($HLMI$) | ASTM D-1238 - Condition F - Measured at 10 times the weight used in the melt index test above. |
| Flow Rate Ratio ($FRR$) = $\frac{\text{Flow Rate}}{\text{Melt Index}}$ | |
| productivity | a sample of the resin product is ashed, and the weight % of ash is determined; since the ash is essentially composed of the supported catalyst, the productivity is thus the pounds of polymer produced per pound of total catalyst consumed. |
| n-hexane extractables | a sample of resin is lightly pressed into film samples and extracted with n-hexane at 50° C. for four hours. |

EXAMPLES

Catalyst Preparation: The catalysts used in the examples were prepared as follows:

To a solution of the desired amount of $CrO_3$ in three liters of distilled water there was added 500 grams of a porous silica support having a particle size of about 70 microns and a surface area of about 300 square meters per gram. The mixture of the support, water and $CrO_3$ was stirred and allowed to stand for about 15 minutes. It was then filtered to remove about 2200–2300 ml of solution. The $CrO_3$ loaded silica was then dried under a stream of nitrogen for about 4 hours at 200° C.

About 400 grams of the supported $CrO_3$ was then slurried in about 2000 ml of dry isopentane, and then a desired amount of tetraisopropyl titanate was added to the slurry. The system was then mixed thoroughly and then the isopentane was dried by heating the reaction vessel.

The dried material was then transferred to an activator (heating vessel) and a desired quantity of $(NH_4)_2SiF_6$ was added and admixed. The composition was then heated under $N_2$ at 50° C. for about 1 hour and then at 150° C. for about 1 hour to insure that all the isopentane was removed and to slowly remove organic residues from the tetraisopropyl titanate so as to avoid any danger of a fire. The $N_2$ stream was then replaced with a stream of dry air and the catalyst composition was activated at 300° C. for about 2 hours and then at 750° C. or 825° C. for about 8 hours. The activated catalyst was then cooled with dry air (at ambient temperatures) to about 150° C. and further cooled from 150° C. to room temperature with $N_2$ (at ambient temperature).

The amounts of the chromium, titanium and fluorine compounds which were added to provide the desired levels of these elements in the activated catalyst are as follows:

| Weight % of compound added to support | Weight % of element in the activated catalyst |
|---|---|
| $CrO_3$ | Cr (as Cr) |
| 0.8 | 0.4 |
| 0.6 | 0.3 |
| 0.53 | 0.26 |
| 0.33 | 0.17 |
| 0.13 | 0.07 |
| Ti(isopropyl)$_4$ | Ti (as Ti) |
| 35 | 5.6 |
| 28 | 4.5 |
| 25 | 4.1 |
| $(NH_4)_2SiF_6$ | F (as F) |
| 1.5 | 0.7 |
| 0.6 | 0.3 |

B. Use of Catalysts

A series of 21 experiments were conducted in which ethylene was copolymerized with butene-1. Each of the reactions was conducted for 2 to 4 hours, after equilibrium was reached, in one or the other of two fluid bed reactor systems. One system, Reactor A, was as described in the drawing. It has a lower section 10 feet high and 13 ½ inches in (inner) diameter, and an upper section which was 16 feet high and 23 ½ inches in (inner) diameter. The other system, Reactor B, has the flared upper section of Reactor A replaced by a straight sided section which was 16 ½ feet high and 13 ½ inches in (inner) diameter. The lower section of Reactor B had the same dimensions as those of the lower section of Reactor A.

EXAMPLES 1 to 8

Examples 1 to 8 were run in Reactor B under a gas velocity of 4 times $G_{mf}$ and a pressure of 300 psig. The catalysts used in these Examples were prepared as disclosed above. After activation, at 825° C., each of the supported catalysts contained 0.4 weight % Cr, 4.5 weight % Ti, and 0.3 weight % of F. The other reaction conditions for Examples 1–8 were as shown in Table I below:

TABLE I

| Example | Temp. °C. | $C_4H_8/C_2H_4$ mol ratio | $H_2/C_2H_4$ mol Ratio | Space Time Yield, lbs/hr/ft³ of bed space |
|---|---|---|---|---|
| 1 | 90 | 0.07 | 0.04 | 5.2 |
| 2 | 89 | 0.10 | — | 8.7 |
| 3 | 90 | 0.10 | — | 5.2 |
| 4 | 90 | 0.09 | — | 6.3 |
| 5 | 90 | 0.11 | — | 6.8 |
| 6 | 95 | 0.085 | — | 7.2 |
| 7 | 95 | 0.07 | — | 6.3 |
| 8 | 95 | 0.07 | — | 7.2 |

The copolymers produced in Examples 1–8 had the properties shown in Table II below:

TABLE II

| Example | M.I. | HLMI | FRR | Den. | % Ash | Productivity | Wt. % n-hexane extract. | Average particle size inches |
|---|---|---|---|---|---|---|---|---|
| 1 | 0.04 | 8.08 | 202 | 0.9237 | 0.013 | 7700 | 0.99 | 0.037 |
| 2 | 0.34 | 34.0 | 99.8 | 0.9166 | 0.012 | 8350 | 6.20 | 0.031 |
| 3 | 0.34 | 27.1 | 80 | 0.9176 | 0.017 | 5900 | 3.32 | 0.042 |
| 4 | 0.07 | 10.4 | 148.8 | 0.9222 | 0.016 | 6250 | 1.49 | 0.036 |
| 5 | 0.05 | 10.5 | 210.5 | 0.9233 | 0.008 | 12,500 | 1.96 | 0.021 |
| 6 | 0.08 | 13.8 | 172 | 0.9213 | 0.009 | 11,100 | 1.41 | 0.035 |
| 7 | 0.21 | 12.6 | 59.9 | 0.9250 | 0.007 | 14,300 | 1.38 | 0.027 |
| 8 | 0.08 | 12.1 | 151 | 0.9222 | 0.009 | 11,100 | 1.11 | 0.027 |

EXAMPLES 9 to 17

Examples 9 to 15 were run in Reactor B, and Examples 16 and 17 were run in Reactor A, under a gas velocity of 4 times $G_{mf}$. The catalysts used in these examples were prepared as disclosed above. After activation, at 825° C., the supported catalysts contained 4.1 or 5.6 weight % of Ti, 0.6 or 1.5 weight % of F and 0.4, 0.26, 0.17 and 0.07 weight % of Cr. The variations in these catalysts, and the other reaction conditions for Examples 9 to 17 were as shown in Table III below:

TABLE III

| Example | wt. % Cr | wt. % Ti | wt. % F | Temp. °C. | Press. psig. | $C_4H_8/C_2H_4$ mol ratio | $H_2/C_2H_4$ mol ratio | Space Time Yield lbs/hr/ft³ of bed space |
|---|---|---|---|---|---|---|---|---|
| 9 | 0.26 | 4.1 | 0.3 | 87.5 | 200 | 0.085 | 0 | 5.0 |
| 10 | 0.17 | 4.1 | 0.3 | 87.5 | 200 | 0.084 | 0 | 4.6 |
| 11 | 0.07 | 4.1 | 0.3 | 87.5 | 200 | 0.084 | 0 | 4.5 |
| 12 | 0.26 | 4.1 | 0.3 | 87.5 | 300 | 0.084 | 0 | 4.8 |

TABLE III-continued

| Example | wt. % Cr | wt. % Ti | wt. % F | Temp. °C. | Press. psig. | $C_3H_8/C_2H_4$ mol ratio | $H_2/C_2H_4$ mol ratio | Space Time Yield lbs/hr/ft³ of bed space |
|---|---|---|---|---|---|---|---|---|
| 13 | 0.26 | 4.1 | 0.3 | 87.5 | 300 | 0.083 | 0.08 | 4.8 |
| 14 | 0.26 | 4.5 | 0.3 | 87.5 | 300 | 0.084 | 0 | 4.8 |
| 15 | 0.07 | 5.6 | 0.3 | 87.5 | 300 | 0.085 | 0 | 4.1 |
| 16 | 0.4 | 4.1 | 0.3 | 85 | 300 | 0.085 | 0 | 5.2 |
| 17 | 0.4 | 4.1 | 0.7 | 85 | 300 | 0.082 | 0 | 5.4 |

The copolymers produced in Examples 9 to 17 had the properties shown below in Table IV.

TABLE IV

| Example | M.I. | HLMI | FRR | Den. | % Ash | Productivity | wt. % n-hexane extract. | Average particle size, inches |
|---|---|---|---|---|---|---|---|---|
| 9  | 0.06 | 8.9  | 148  | 0.9228 | 0.009 | 11,100 | 3.32 | 0.035 |
| 10 | 0.09 | 11.9 | 132  | 0.9238 | 0.011 | 9,090  | 3.48 | 0.028 |
| 11 | 0.11 | 10.2 | 92.5 | 0.9211 | 0.015 | 6,680  | 3.26 | 0.037 |
| 12 | 0.08 | 10.6 | 132  | 0.9245 | 0.009 | 11,100 | 3.37 | 0.025 |
| 13 | 0.07 | 10.9 | 156  | 0.9242 | 0.013 | 7,700  | 3.45 | 0.032 |
| 14 | 0.08 | 10.6 | 132  | 0.9245 | 0.009 | 11,100 | 3.37 | 0.025 |
| 15 | 0.09 | 9.3  | 103  | 0.9232 | 0.011 | 9,100  | 1.55 | 0.035 |
| 16 | 0.11 | 17.9 | 163  | 0.9228 | 0.011 | 9,100  | 5.16 | 0.028 |
| 17 | 0.04 | 4.9  | 122  | 0.918  | 0.016 | 6,250  | 5.76 | 0.034 |

EXAMPLES 18 to 21

Examples 18 to 21 were run in Reactor B under a pressure of 300 psig and a gas velocity of 4 times $G_{mf}$. The catalysts used in these examples were prepared as disclosed above. After activation, at 825° C., each of the supported catalysts contained 0.4 weight %, Cr, 4.5 weight % of Ti and 0.3 weight % of F. The other reaction conditions for Examples 18 to 21 were as shown in Table V below:

TABLE V

| Example | Temp. °C. | $C_3H_8/C_2H_4$ mol Ratio | Space Time Yield lbs/hr/ft³ of bed space |
|---|---|---|---|
| 18 | 86 | 0.07  | 3.7 |
| 19 | 89 | 0.06  | 3.7 |
| 20 | 85 | 0.085 | 4.3 |
| 21 | 95 | 0.04  | 3.6 |

The copolymers produced in Examples 18 to 21 had the properties shown in Table VI below:

TABLE VI

| Example | M.I. | HLMI | FRR | Den. | % Ash | Productivity | wt. % n-hexane extract. | Average particle size, inches |
|---|---|---|---|---|---|---|---|---|
| 18 | 0.14 | 16.5 | 116 | 0.925 | 0.046 | 2200   | 1.75 | 0.02 |
| 19 | 0.23 | 24.1 | 105 | 0.925 | 0.005 | 20,000 | 1.65 | 0.02 |
| 20 | 0.51 | 36.7 | 72  | 0.917 | 0.021 | 4800   | 5.0  | 0.03 |
| 21 | 0.14 | 14.3 | 102 | 0.935 | 0.008 | 12,500 | 3.7  | 0.02 |

What is claimed is:

1. A process for producing solid ethylene polymers having a density of less than 0.941 and a melt index of >0.0 to at least about 2.0 under relatively low pressure conditions which comprises
copolymerizing ethylene with sufficient quantities of $C_3$ to $C_6$ α-olefin monomer to provide the desired density in the copolymer product
in a fluid bed process at a temperature of about 30° to 105° C., under a pressure of less than about 1000 psi, and under a mass gas flow rate of about 1.5 to 10 times $G_{mf}$
by contacting the monomers with fluidized particles of a supported catalyst wherein said particles have an average diameter of about 50 to 200 microns
said supported catalyst having been activated in air or oxygen at a temperature of about 300° to 900° C., and comprising, based on the total weight of the support and the catalyst,
about 0.05 to 3.0 weight percent of chromium,
about 1.5 to 9.0 weight percent of titanium, and
>0.0 to about 2.5 weight percent of fluorine, said chromium and said titanium being in the form of oxides after said activation.

2. A process as in claim 1 for producing solid ethylene polymers having a melt index of about 0.1 to 1.0.

3. A process as in claim 2 for producing solid ethylene polymers having a density of about 0.900 to 0.925.

4. A process as in claim 2 for producing solid ethylene polymers having a density of about 0.926 to 0.940.

5. A process as in claim 1 for producing solid copolymers of ethylene and propylene.

6. A process as in claim 1 for producing solid copolymers of ethylene and butene-1.

7. A process as in claim 1 for producing solid copolymers of ethylene and hexane-1.

8. A process as in claim 1 for producing solid ethylene polymers at a temperature of about 85° to 100° C., under a pressure of about 200 to 350 psi and under a mass gas flow rate of about 3 to 6 times $G_{mf}$.

9. A process as in claim 8 in which said catalyst comprises
about 0.2 to 1.0 weight percent of chromium,
about 4 to 7 weight percent of titanium, and
about 0.1 to 1.0 weight percent of fluorine.

10. A process as in claim 9 in which said support comprises silica.

* * * * *

UNITED STATES PATENT OFFICE
CERTIFICATE OF CORRECTION

Patent No. 4,011,382      Dated March 8, 1977

Inventor(s) I. J. Levine et al.

It is certified that error appears in the above-identified patent and that said Letters Patent are hereby corrected as shown below:

Column 3, line 28, ">15%" should read --<15%--.

Column 9, line 28, "are" should read --and--.

Column 14, line 57, "hexane-1" should read --hexene-1--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*